United States Patent [19]

Sage

[11] 4,241,371
[45] Dec. 23, 1980

[54] SINGLE FILAMENT, DUAL FUNCTION, VEHICLE SIGNAL LAMP

[75] Inventor: Howard A. Sage, Laguna Hills, Calif.

[73] Assignee: Truck-Lite Company, Inc., Falconer, N.Y.

[21] Appl. No.: 21,803

[22] Filed: Mar. 19, 1979

[51] Int. Cl.³ .............................................. B60Q 1/04
[52] U.S. Cl. .................................... 362/61; 362/276; 248/1
[58] Field of Search ................. 362/61, 276, 295, 296, 362/211; 361/395, 396, 399; 248/1, 27.1

[56] References Cited

U.S. PATENT DOCUMENTS

| | | | |
|---|---|---|---|
| 1,595,535 | 8/1926 | Wood | 362/211 |
| 3,040,207 | 6/1962 | Grontowski | 362/276 |
| 3,058,037 | 10/1962 | Naab | 361/396 |
| 3,273,012 | 9/1966 | Rosenblum | 315/83 |
| 3,327,110 | 6/1967 | Baldwin | 362/296 |
| 3,337,775 | 8/1967 | Scoles | 361/399 |
| 3,840,776 | 10/1974 | Takeda | 315/82 |
| 3,924,154 | 12/1975 | Minks | 315/82 |

FOREIGN PATENT DOCUMENTS 2231180 12/1974 France ..................................... 361/399

Primary Examiner—Samuel W. Engle
Assistant Examiner—Edward F. Miles
Attorney, Agent, or Firm—Mason, Fenwick & Lawrence

[57] ABSTRACT

A single filament dual function shock mounted or conventional vehicle signal lamp assembly adapted to be connected to vehicle safety light signalling circuits to serve tail and stop/turn lamp functions and the like, comprising a unitary molded rear backing housing member serving as a reflector and a lamp housing and a lens cover member sealed about its perimeter to the housing member and enclosing a single filament lamp bulb which may be shock mounted within the cavity of the housing. A generally flat annular electronic circuit board in the form of an interrupted ring shaped to encircle the housing cavity is mounted inwardly adjacent the lens cover at the perimeter of the cavity and includes a pair of unidirectionally conductive diodes and an elongated resistor element rigidly mounted on the circuit board to couple the lamp bulb to vehicle control circuits to serve tail and turn/stop signal functions.

15 Claims, 10 Drawing Figures

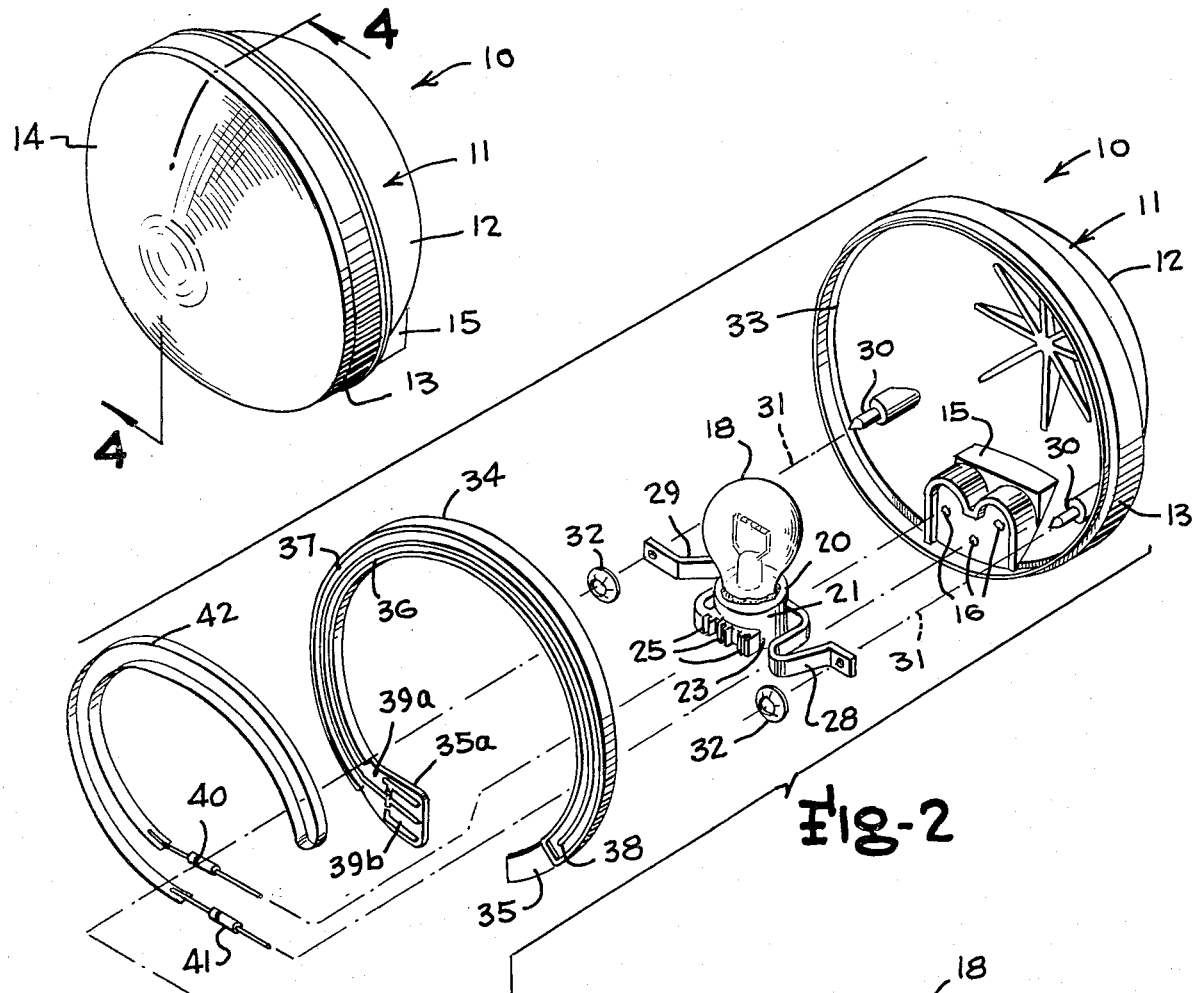
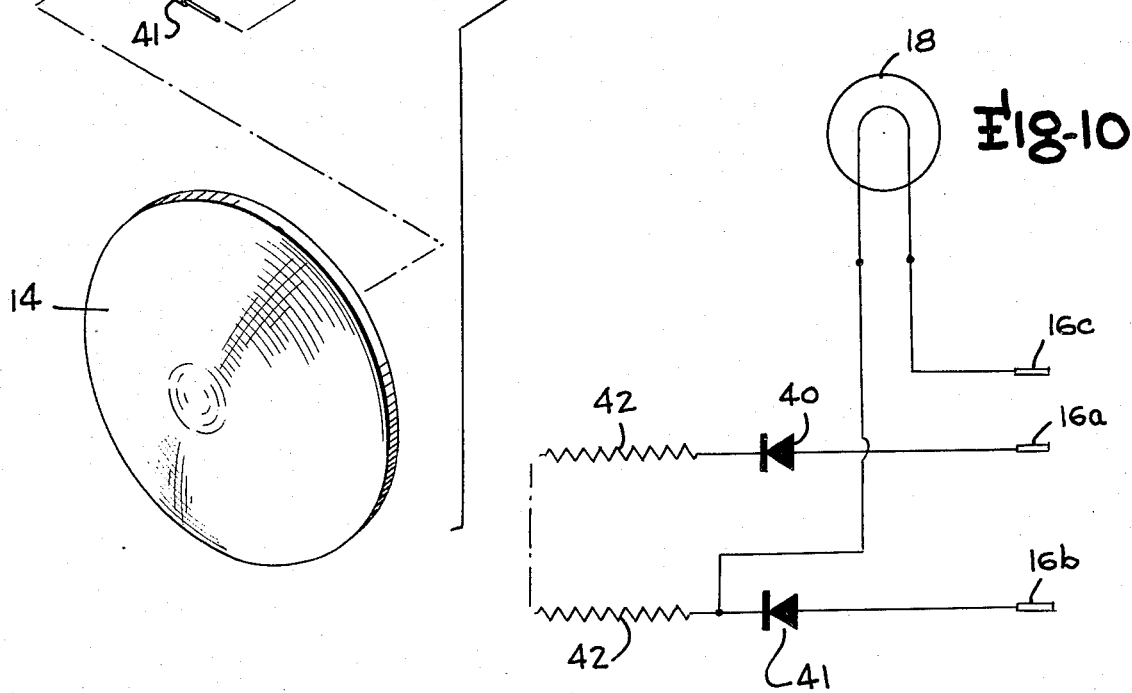

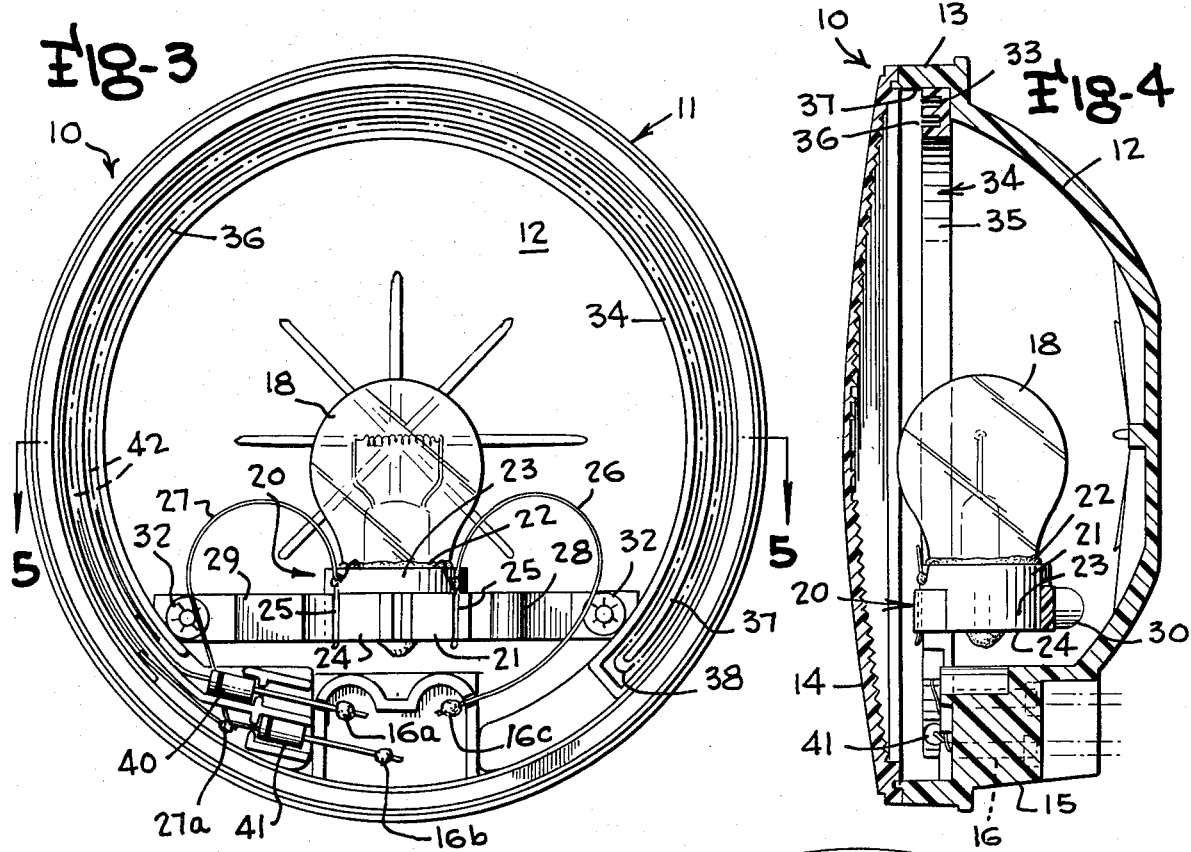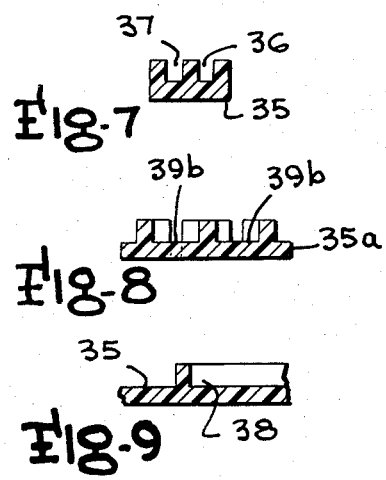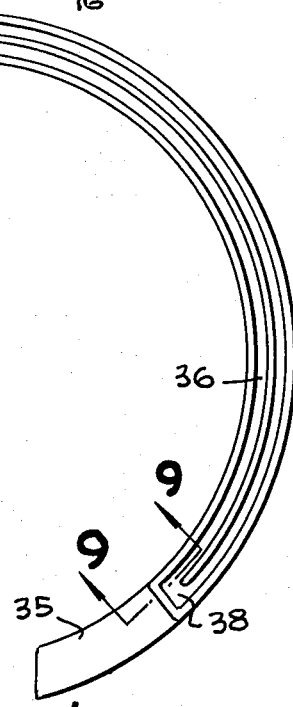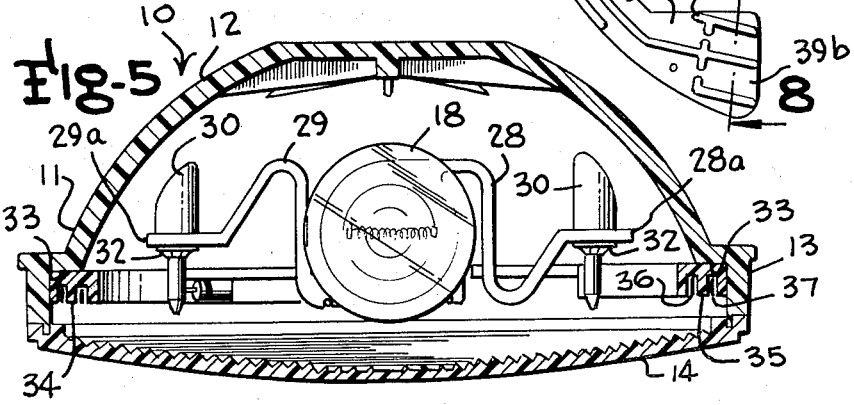

SINGLE FILAMENT, DUAL FUNCTION, VEHICLE SIGNAL LAMP

BACKGROUND AND OBJECTS OF THE INVENTION

The present invention relates in general to shock mounted filament type vehicle lamps adapted to perform stop and/or turn and tail signalling functions, and more particularly to vehicle lamps having a single shock mounted filament capable of performing dual functions such as low intensity tail lamp functions and bright or higher intensity stop and/or turn signalling.

Heretofore, a number of signalling lamps for vehicles, such as automobiles, trucks, trailers and the like, have been provided which are capable of performing both relatively low intensity tail lamp functions signalling the location of portions of the vehicle, and higher intensity stop and/or turn signalling functions wherein the tail lamp or lamp glows more brightly. However, most of such prior art dual function vehicle signal lamps have used two filaments, one of which is energized for the lower intensity signalling functions and the other of which is energized for the higher intensity signal functions. Earlier U.S. Pat. No. 1,595,535 to Wood disclosed a headlight bulb with a single filament, having a resistance wire connected between one end of the filament and a connection terminal so that the resistance wire can be placed in circuit with the filament to operate at reduced intensity in one operating mode and the resistance wire could be bypassed to cause the lamp to operate at a higher intensity level. Also, vehicle lamp systems involving complicated circuitry for providing variable intensity automobile lighting with a single filament have also been proposed, as in U.S. Pat. No. 3,040,207 To Grontkowski, but improvements in signalling lamps to avoid the complicated circuitry of the above mentioned patent in vehicle lamps designed particularly for the severe shock loads encountered by signalling lamps on trucks, trailers and the like for stop and/or turn and tail signalling functions are desired, particularly to eliminate the minor or low intensity filament present in such dual function signalling or illuminating lamps designed for this purpose which become very brittle and susceptible to shock and/or high impact failures, and thereby extend the life of lamps used for such purposes. Also, it is desired to reduce thermal shock on the filament, which is accomplished in the present invention by heating it continuously while the vehicle lights are activated and render the lamp interchangeable with conventional lamps.

The problem of short life in relation to lamp failure in the automotive industry is especially acute in the trucking industry, where the lamps are subject to frequent and intense shock and high-impact forces. The incorporation of a shock mount such as proposed in prior U.S. Pat. No. 3,327,110 granted June 20, 1967 to the assignee of the present application has succeeded in extending the life of such automotive lamps for trucking applications manyfold over that of a conventional rigid mount. However, the problem of the minor filament in dual filament lamps designed to be energized for low intensity or dim signalling functions being too fragile has still been present and has led to premature failure due to shocks and high-impact stresses.

An object of the present invention, therefore, is the provision of a novel single filament lamp assembly designed to perform the usual functions of dual filament lamps for use in the vehicle industry for stop and/or turn and/or tail signalling or illuminating functions by elimination of the minor filament present in such prior signalling lamps through the use of electronics while still enabling the single filament bulb to perform the same functions as dual filament bulbs.

Another object of the present invention is the provision of a novel single filament lamp assembly for vehicle signalling applications as described in the immediately preceding paragraph, wherein the electronics permitting the single filament to serve the functions of two filaments is rigidly incorporated in a solid-state electronic system fixed in the rim or peripheral portion of the reflector and lamp housing member, which lends itself to ease of installation and economical construction.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a perspective view of a vehicle lamp assembly having a single filament shock mounted bulb, embodying the present invention;

FIG. 2 is an exploded perspective view of the vehicle lamp assembly;

FIG. 3 is a front elevation view of the lamp assembly, with the lens cover removed;

FIG. 4 is a vertical section view through the lamp assembly, taken along the line 4—4 of FIG. 1;

FIG. 5, is a horizontal section view through the lamp assembly, taken along the line 5—5 of FIG. 3;

FIG. 6 is a front elevation view of the annular molded circuit board;

FIG. 7 is a transverse section view taken along the line 7—7 of FIG. 6 through a portion of the circuit board;

FIG. 8 is a transverse section view through the circuit board, taken along the line 8—8 of FIG. 6;

FIG. 9 is a fragmentary longitudinal section view through the circuit board, taken along the line 9—9 of FIG. 6; and FIG. 10 is a schematic diagram of the electrical circuit formed by the elements on the circuit board assembly.

DETAILED DESCRIPTION OF A PREFERRED EMBODIMENT

Referring to the drawings, wherein like reference characters designate corresponding parts throughout the several Figures, there is illustrated a vehicle lamp assembly constructed in accordance with the present invention, indicated generally by the reference character 10, formed of a lamp housing member 11, for example of molded plastic, shaped to form the concave reflector portion 12 of the lamp assembly and having an annular, generally cylindrical rim portion 13 at the front or forward portion of the lamp housing member 11. A lens cover member 14, also of molded plastic in the preferred embodiment, for example made of a red colored plastic material, is sealed to the front or open end of the reflector forming lamp housing member 11. Also, the reflector forming housing member 11 includes an enlargement formation 15 projecting rearwardly from the rim portion 13 having a plurality of electrical contact pins, generally indicated at 16, incorporated therein adapted to be coupled with a conventional electrical connecting plug through which electrical connections are established with the electrical circuitry and the lamp bulb 18 to be housed in the lamp housing assembly. This assembly is adapted to be securely mounted in any suitable fashion on a vehicle, such as a truck or trailer at appropriate locations.

The lamp bulb to be housed in the lamp assembly 10 formed by the housing member 11 and lens cover member 14 is indicated generally by the reference character 18 and may either of the unbased type to be secured in position within the mount 20 therefor by use of a resilient potting compound, or the lamp bulb 18 may be of the based type adapted to be removably fitted in a socket such as a bayonet socket or a threaded socket in the mount 20. However, in the illustrated embodiment the lamp bulb 18 is of the unbased type to be potted in the mount 20. To this end, the mount 20 is a plastic shock mount designed to provide variable rate spring action shock mounting for the bulb constructed generally in accordance with the structure of the shock mount disclosed in earlier U.S. Pat. No. 3,327,110 granted June 20, 1967 and assigned to the assignor of the present application, wherein a socket-like receptacle portion 21 is provided to form a receiving socket within which the lower portion of the lamp bulb 18 is nested and which is securely held in position therein by potting compound generally indicated at 22. The receptacle portion 21 of the shock mount 20 includes an annular, generally cylindrical wall 23 which is circular in cross section and is joined to a circular bottom wall 24 having a central opening if needed through which the lowermost portion of the lamp bulb 18 may extend. Positioning ribs may be provided, if desired, along the interior surface of the cylindrical side wall portion 23 as disclosed in said earlier patent. Also, as disclosed in said earlier patent, grooved projections indicated generally at 25 are provided externally of the annular cylindrical wall 23 to receive filament leads formed by the C-wires 26 and 27 as shown.

Shock absorbing mounting legs, indicated at 28 and 29, having the configuration illustrated in said earlier U.S. Pat. No. 3,327,110 extend from the receptacle portion 21 and are connected at their outer ends to the reflector portion 12 of the lamp housing member 11 at forwardly projecting mounting pillars or post formations 30 providing a pivotal mount or pivot-like mounts for the outer end portions of the shock absorbing mounting legs 28, 29 relative to parallel horizontal fore and aft axes indicated at 31. The shock absorbing mounting legs 28,29 are integrally joined to the receptacle portion 21, as the mount 20 is formed as a unitary molded plastic structure, and the legs 28,29 extend from the receptacle portion 21 initially along tangential paths relative to the outer surface of the receptacle portion 21 at diametrically spaced apart locations and execute or extend along curved paths in their intermediate portions, producing a serpentine appearance when viewed in top plan, providing bellows-like curves in the midportions of the legs to absorb shocks. This permits the legs 28,29 to bend and flex in a generally horizontal plane to accommodate displacement of the receptable portion 21 parallel to this plane in fore and aft directions, transverse directions perpendicular to the axes 31 of the mounting post 30, and also the tangential connection of the flexible mounting legs 28,29 with the receptacle portion 21 accommodate angular displacement of the receptacle portion about a vertical axis. By anchoring of the end portions 28a,29a of the legs 28,29 at the mounting post 30, the legs, which are formed of flexibly deformable plastic material suspend the receptacle portion 21 for displacement in all directions parallel to the horizontal plane and also accommodate vertical movement of the receptacle portion by flexible deformation of the legs.

In the illustrated embodiment, the outer end portions 28a,29a of the shock absorbing legs 28,29 are pivotally connected to the mounting posts or pillars 30 by plastic lug formations on the mounting post 30 extending through apertures in the outer end portions 28a,29a of the legs and by crest fasteners 32 assembled onto the lugs of the mounting posts 30.

Radially inwardly adjacent the rim formation 13 of the lamp housing member 11 at the front of the housing is a generally circular annular land or shoulder forming a briefly interrupted annulus, indicated generally at 33, providing a mounting surface recessed a short distance rearwardly of the lens cover 14 to support an interrupted annular circuit board assembly 34 of similar size and configuration to provide appropriate circuitry for causing the single filament lamp bulb 18 to serve the stop and/or turn and/or tail functions of typical dual filament lamps. The circuit board assembly 34 of the preferred embodiment comprises an interrupted annular circuit board member 35 best illustrated in FIGS. 6 through 9, which may be molded of glass reinforced nylon in one satisfactory embodiment, and is shaped to provide two forwardly opening channels 36 and 37 as illustrated in FIG. 7, providing a cross sectional configuration resembling an upper case E over most of the circumference of the circuit board member 35. At one end of the concentric channels 36 and 37, in the zone indicated at 38, the two channels join, while at the other end the circuit board member is enlarged as indicated at 35a and is shaped to provide sockets or recesses 39a and 39b for diodes 40 and 41. In the illustrated embodiment, a length, for example about 17¼ inches long, of elongated electrical resistance material such as resistance wire forming a resistor 42 is laid in the full length of the two interconnected channels or grooves 36,37 and the joined end groove portion 38 thereof. For a 12 volt electrical system, this resistor 42 has a resistance value of about 4 ohms, and is of higher resistance value for higher voltage systems, for example about 17 ohms for a 28 volt system. The ends of the resistance wire 42 adjacent the end of the channels near the enlargement 35a are electrically connected to the conductors extending from one end of the diodes 40,41. Alternatively, a strip of nichrome foil of about 0.045 width may be used instead of resistance wire to form the resister 42. In one satisfactory example, the resistance wire 42 in the inner channel 36 may be connected to at least a 2 amp diode, such as an International Rectifier 2 amp diode No. 20D05, the other connector may be connected to the contact pin 16a, and the end of the resistance wire 42 in the channel 37 may be connected to a conductor of at least a 3 amp diode 41, which may be an International Rectifier 3 amp diode No. 30505 whose other conductor is connected to the intermediate contact pin 16b. As illustrated, the C-wire 26 connected to one of the terminals of the single filament lamp bulb 16 may be also be connected to the third contact pin 16c, and the other C-wire 27 may be connected by low temperature solder to the conductor of the 3 amp diode 41 as indicated at 27a, which is the conductor opposite the one connected to the contact pin 16b.

Referring to the schematic diagram in FIG. 10, and assuming the electrical connector plug is connected to the contact pins 16a–16c, the contact pin 16c forms the ground connection for the lamp bulb 16, the contact 16b forms the connection to the stop and/or turn signal circuit from the vehicle, and the contact pin 16a forms the connection to the tail lamp circuit of the vehicle. It will be apparent that the 2 amp diode 40 forms an isolation diode to prevent stop and/or turn signal voltages from energizing the lamps connected to the tail lamp circuits of the vehicle and the 3 amp diode 41 provides an isolation diode to prevent tail lamp voltage from energizing the signal lamps when they are connected to the stop or turn signal lamp circuits of the vehicle. When tail lamp circuit voltage is applied to the contact pin 16a, current flows through the diode 40 and the full length of the nichrome foil resistor 42 and through C-wire 27 to one end of the filament of the lamp bulb 18, and through C-wire 26 and contact 16c to ground. The nichrome resistor 42 drops the voltage applied to the lamp filament, causing the lamp bulb 18 to glow at the lower intensity or dim tail lamp intensity level. When stop lamp or turn lamp circuit voltages are applied, these are applied to the contact pin 16b and current flows through the 3 amp diode 41 and the C-wire 27 directly to the filament of the lamp bulb 18, without the voltage being reduced by the nichrome foil 42, thus causing the lamp bulb to glow at the brighter or stop lamp intensity. It will be apparent that when both tail and stop/turn voltages are present, the lamp will glow at the higher or stop lamp intensity, since the lamp will see the higher potential applied through the 3 amp diode 41 and glow at its higher intensity. As such time as the stop or turn circuit through the diode 41 is de-energized and the tail lamp circuit through diode 40 is still energized, the lamp bulb 18 will see the lower potential of the tail lamp circuit and return to its lower intensity.

It will be apparent that the nichrome foil or nichrome wire resistor 42 is selected to have such a value in conjunction with the filament characteristics of the particular lamp bulb 18 employed in the vehicle lamp assembly to so limit the current flow through the lamp filament as to cause the filament to glow at less than its rated intensity and thus provide the tail lamp function. By this arrangement, the electronic components made up of the resistor wire or foil and diodes may be formed as a separate subassembly on the circuit board member 35 and encased by suitable potting compound or the like, and then be positioned in the lamp housing against the supporting surface formed by the interrupted annular land or shoulder 33 immediately inwardly and rearwardly of the rim portion 13 of the lamp housing member 11 so as to provide for a convenient and economical assembly and one in which the electronic components are not disposed in anyway which would restrict the motion of the shock mount or the photometric parameter of the lamp.

I claim:

1. A single filament dual function vehicle signal lamp assembly adapted to be connected to vehicle safety light signalling or illuminating circuits to serve functions previously served by dual filament vehicle lamps including tail and stop/turn lamp functions and the like, comprising a rear backing housing member serving as a reflector and lamp housing having a forwardly facing cavity bounded by a concavely curved reflector surface, a lens cover member joined about its perimeter to the housing member to cover said cavity, a single filament lamp bulb in said cavity, a generally flat annular electronic circuit board mounted in said housing in the form of an interrupted ring shaped to encircle said cavity and reflector surface inwardly adjacent the lens cover, at the perimeter of the cavity, said circuit board having a pair of unidirectionally conductive diodes and an elongated resistor element rigidly mounted on said board and connected to said lamp bulb and to external connectors to be interconnected with tail and turn/stop control circuits of the associated vehicle, said diodes and resistor element being interconnected to apply a higher voltage to the lamp bulb filament through one diode for turn or stop signal functions at a relatively brighter light intensity and applying a lower voltage to the filament through the other diode and resistor element for tail lamp signal functions at a relatively dim light intensity.

2. A vehicle lamp assembly as defined in claim 1, wherein said resistance element is a recurved elongated wire of electrical resistance material or the like extending in a circular path concentric with a fore and aft center axis of the cavity.

3. A vehicle lamp assembly as defined in claim 1, wherein said resistance element is a recurved elongated wire of electrical resistance material or the like extending in a circular path concentric with a fore and aft center axis of the cavity circumferentially over most of a complete circle.

4. A vehicle lamp assembly as defined in claim 1, wherein said resistance element is a recurved elongated wire of electrical resistance material of the like extending in a circular path concentric with a fore and aft center axis of the cavity circumferentially over most of a complete circle providing two adjacent concentric legs of said resistance wire traversing said circular path.

5. A vehicle lamp assembly as defined in claim 2, wherein said circuit board is in the form of a flat interrupted annular board member having a pair of forwardly facing concentric adjacent circular grooves joined by an interconnecting cross groove at one end and receiving said recurved elongated resistance wire nested therein.

6. A vehicle lamp assembly as defined in claim 3, wherein said circuit board is in the form of a flat interrupted annular board member having a pair of forwardly facing concentric adjacent circular grooves joined by an interconnecting cross groove at one end and receiving said recurved elongated resistance wire nested therein.

7. A vehicle lamp assembly as defined in claim 4, wherein said circuit board is in the form of a flat interrupted annular board member having a pair of forwardly facing concentric adjacent circular grooves joined by an interconnecting cross groove at one end and receiving said recurved elongated resistance wire nested therein.

8. A vehicle lamp assembly as defined in claim 2, wherein said circuit board is in the form of a flat interrupted annular board member having a pair of forwardly facing concentric adjacent circular grooves joined by an interconnecting cross groove at one end and receiving said recurved elongated resistance wire nested therein and having shaped recesses joining the other ends of said pair of circular grooves and receiving said diodes in nested relation therein.

9. A vehicle lamp assembly as defined in claim 4, wherein said circuit board is in the form of a flat interrupted annular board member having a pair of forwardly facing concentric adjacent circular grooves joined by an interconnecting cross groove at one end and receiving said recurved elongated resistance wire nested therein and having shaped recesses joining the other ends of said pair of circular grooves and receiving said diodes in nested relation therein.

10. A vehicle lamp assembly as defined in claim 1, wherein said housing member includes an annular flat forwardly facing shoulder spaced rearwardly from and adjacent the lens cover substantially encircling the front perimeter of said cavity providing a land conforming substantially to the configuration of the rear surface of said circuit board against which the circuit board is mounted to rigidly support the circuit board assembly.

11. A vehicle lamp assembly as defined in claim 2, wherein said housing member includes an annular flat forwardly facing shoulder spaced rearwardly from and adjacent the lens cover substantially encircling the front perimeter of said cavity providing a land conforming substantially to the configuration of the rear surface of said circuit board against which the circuit board is mounted to rigidly support the circuit board assembly.

12. A vehicle lamp assembly as defined in claim 4, wherein said housing member includes an annular flat forwardly facing shoulder spaced rearwardly from and adjacent the lens cover substantially encircling the front perimeter of said cavity providing a land conforming substantially to the configuration of the rear surface of said circuit board against which the circuit board is mounted to rigidly support the circuit board assembly.

13. A vehicle lamp assembly as defined in claim 5, wherein said housing member includes an annular flat forwardly facing shoulder spaced rearwardly from and adjacent the lens cover substantially encircling the front perimeter of said cavity providing a land conforming substantially to the configuration of the rear surface of said circuit board against which the circuit board is mounted to rigidly support the circuit board assembly.

14. A vehicle lamp assembly as defined in claim 7, wherein said housing member includes an annular flat forwardly facing shoulder spaced rearwardly from and adjacent the lens cover substantially encircling the front perimeter of said cavity providing a land conforming substantially to the configuration of the rear surface of said circuit board against which the circuit board is mounted to rigidly support the circuit board assembly.

15. A vehicle lamp assembly as defined in claim 9, wherein said housing member includes an annular flat forwardly facing shoulder spaced rearwardly from and adjacent the lens cover substantially encircling the front perimeter of said cavity providing a land conforming substantially to the configuration of the rear surface of said circuit board against which the circuit board is mounted to rigidly support the circuit board assembly.

* * * * *